United States Patent
Nagakura et al.

(10) Patent No.: US 7,490,863 B2
(45) Date of Patent: Feb. 17, 2009

(54) JOINT FOR FUEL TANK AND METHOD FOR MANUFACTURING THE SAME

(75) Inventors: Kouichi Nagakura, Kanagawa (JP); Shinichi Matsuo, Kanagawa (JP)

(73) Assignee: Piolax Inc., Yokohama-shi, Kanagawa-ken (JP)

( * ) Notice: Subject to any disclaimer, the term of this patent is extended or adjusted under 35 U.S.C. 154(b) by 484 days.

(21) Appl. No.: 11/004,844

(22) Filed: Dec. 7, 2004

(65) Prior Publication Data
US 2005/0133509 A1 Jun. 23, 2005

(30) Foreign Application Priority Data
Dec. 8, 2003 (JP) .......................... P2003-408591
Nov. 26, 2004 (JP) .......................... P2004-341442

(51) Int. Cl.
*F16L 35/00* (2006.01)
(52) U.S. Cl. .................. 285/288.1; 285/423; 285/141.1
(58) Field of Classification Search .............. 285/288.1, 285/423, 141.1
See application file for complete search history.

(56) References Cited

U.S. PATENT DOCUMENTS
5,443,098 A 8/1995 Kertesz
6,737,132 B1 * 5/2004 Michihata et al. .......... 428/35.7
7,089,952 B2 * 8/2006 Nakamura et al. ......... 137/15.01

FOREIGN PATENT DOCUMENTS
JP 2000-8981 1/2000

* cited by examiner

*Primary Examiner*—David E Bochna
(74) *Attorney, Agent, or Firm*—McGinn IP Law Group, PLLC

(57) ABSTRACT

A joint for fuel tank is attached to an opening of a resin fuel tank. The joint includes a joint main body and a flanged junction. The flanged junction is connected to the joint main body and is weldable to a periphery of the opening of the fuel tank. The joint main body includes a semi-aromatic polyamide obtained by polymerization of source monomers containing an aromatic monomer component and an aliphatic monomer component. An amount of a terminal amino group of the semi-aromatic polyamide is greater than or equal to 40 µeq/g. The junction includes a modified polyolefin having: a density in a range of 0.930 to 0.950; and a melt flow rate as measured in accordance with JIS-K7210 in a range of 0.06 to 3.0 g/10 minutes.

18 Claims, 1 Drawing Sheet

JOINT FOR FUEL TANK AND METHOD FOR MANUFACTURING THE SAME

BACKGROUND OF THE INVENTION

1. Field of the Invention

The present invention relates to a joint for fuel tank, which can be attached to, e.g., an opening of a resin fuel tank of a vehicle by means of welding, and relates to a method for manufacturing the same.

2. Description of the Related Art

A variety of piping structures, such as a feeder pipe connected to an oil filler, a fuel supply pipe connected to an engine, and a vapor exhaust pipe connected to a canister, are connected by means of welding to openings of a resin fuel tank of a vehicle, as joints.

Nowadays, fuel non-permeability of a fuel tank is sought. Such a fuel tank generally has a multilayer structure in which barrier resin layers being excellent in fuel non-permeability and high-density polyethylene layers are combined, with the outermost layer being formed from a high-density polyethylene, etc.

Meanwhile, since a main body of the joint is made of a polyamide or the like, the outermost layer of the fuel tank cannot be directly bonded to the joint main body by means of thermal welding. Therefore, a joint member having a junction—which can be welded to the periphery of an opening of a fuel tank and which can be molded integrally with the joint main body—is formed beforehand by means of insert molding or the like in advance. Subsequently, the fuel tank and the joint main body are integrated together via the junction by means of welding the junction to the fuel tank.

As an example of such a joint, JP-A-2000-8981 discloses that a case main body of a fuel shut-off valve is attached to a mounting hole of a fuel tank whose surface is made of polyethylene, via an annular welding section; a flange section of the case main body is made of a polyamide or polyacetal; and the annular welding section is made of a modified olefin resin to which a polar functional group is added.

U.S. Pat. No. 5,443,098 discloses a thermoplastic resin pipe joint for connecting a flexible fluid-conduit to a tank. A first elongated tubular member has a first end section for engaging with the conduit, and a second end section for engaging with a second member of the joint. The second member is attached to the tank. The first member of the joint is made of a polyamide for reinforcement. The second member of the joint is made of a resin, which is not for reinforcement purpose.

SUMMARY OF THE INVENTION

As described above, a fuel tank per se can be imparted with fuel non-permeability when being formed into a multilayer structure including a barrier resin layer. However, fuel permeates not only from the fuel tank but also from a joint section connected to the fuel tank, and the amount of fuel permeating from the joint sections is not negligible. Therefore, in order to reduce fuel permeability of the entire fuel tank including the joint, fuel permeation through the joint section must be reduced.

However, in JP-A-2000-8981, a flanged section of the case main body is made of a polyamide or a polyacetal, and fuel permeability from joint sections is not considered.

In U.S. Pat. No. 5,443,098, an aliphatic polyamide is exemplified as a polyamide used for the joint main body. However, of aliphatic polyamides, for instance, nylon 11 or nylon 12 is insufficient in terms of fuel non-permeability, particularly in terms of permeation-inhibition against fuel containing alcohol. Furthermore, nylon 6, nylon 66, or the like, is inferior also in chemical resistance against calcium chloride or the like which is used as an antifreezing agent.

The invention aims at providing a joint to be attached to an opening of a resin fuel tank by means of thermal welding and which is excellent in fuel non-permeability and has a good chemical resistance.

To achieve the above object, according to a first aspect of the invention, a joint for fuel tank is attached to an opening of a resin fuel tank. The joint includes a joint main body and a flanged junction. The flanged junction is connected to the joint main body and is weldable to a periphery of the opening of the fuel tank. The joint main body includes a semi-aromatic polyamide obtained by polymerization of source monomers containing an aromatic monomer component and an aliphatic monomer component. An amount of a terminal amino group of the semi-aromatic polyamide is greater than or equal to 40 µeq/g. The junction includes a modified polyolefin having: a density in a range of 0.930 to 0.950 g/cm$^3$; and a melt flow rate as measured in accordance with JIS-K7210 in a range of 0.06 to 3.0 g/10 minutes.

With this configuration, since the semi-aromatic polyamide is used for the joint main body, fuel non-permeability is enhanced as compared with a case where solely an aliphatic polyamide without aromatic ring is used.

In addition, since the semi-aromatic polyamide partially contains the aliphatic component, moldability is not decreased, in contrast to a case of a wholly aromatic polyamide. Furthermore, since the amount of the terminal amino group of a semi-aromatic polyamide is greater than or equal to 40 µeq/g, the amino group remains at terminals. Accordingly, adhesive strength of the joint to a modified polyolefin of the junction is increased.

Furthermore, the density of the modified polyolefin of the junction is in a range of 0.930 to 0.950 g/cm$^3$, and the melt flow rate as measured in accordance with JIS-K7210 is in a range of 0.06 to 3.0 g/10 minutes. Therefore, while moldability of the junction is maintained so as to allow injection molding, density of the modified polyolefin is set to a rather higher value so as to decrease fuel permeability of the junction. Consequently, fuel permeation can be reduced through not only the joint main body but also the junctions.

According to a second aspect of the invention, a method for manufacturing a joint for fuel tank to be attached to an opening of a resin fuel tank, the joint including a joint main body; and a flanged junction, which is connected to the joint main body and is weldable to a periphery of the opening of the fuel tank, the method includes primarily molding the junction from a modified polyolefin; after the primarily molding, setting the junction into an injection molding die for the joint main body; and insert-molding the joint main body with using a semi-aromatic polyamide obtained by polymerization of source monomers containing aromatic monomers and aliphatic monomers. The insert-molding is performed within a temperature range of from a melting point of the semi-aromatic polyamide plus 30° C. to a thermal decomposition point of the semi-aromatic polyamide.

With this method, since secondary molding, that is, the insert molding is performed within the above-mentioned temperature range, the semi-aromatic polyamide can be maintained in a melted state for a long time, thereby accelerating the reaction. Accordingly, adhesive strength between the joint main body and the junction can be further enhanced.

According to a third aspect of the invention, the injection molding die for the joint main body is maintained at 80° C. to 120° C.

With this method, since the injection-molding die is maintained within the above-mentioned temperature range, hardening of the semi-aromatic polyamide under rapid cooling can be prevented. Accordingly, deterioration of crystallinity of the semi-aromatic polyamide is prevented, whereby adhesive strength between the joint main body and the junction can be further enhanced.

Embodiments of the invention provide a joint for fuel tank, as well as a method for manufacturing the same, which is excellent in non-permeability of fuel through the joint section and which has good calcium chloride resistance, while moldability of the joint is maintained.

DETAILED DESCRIPTION OF THE PREFERRED EMBODIMENT

Figure 1:
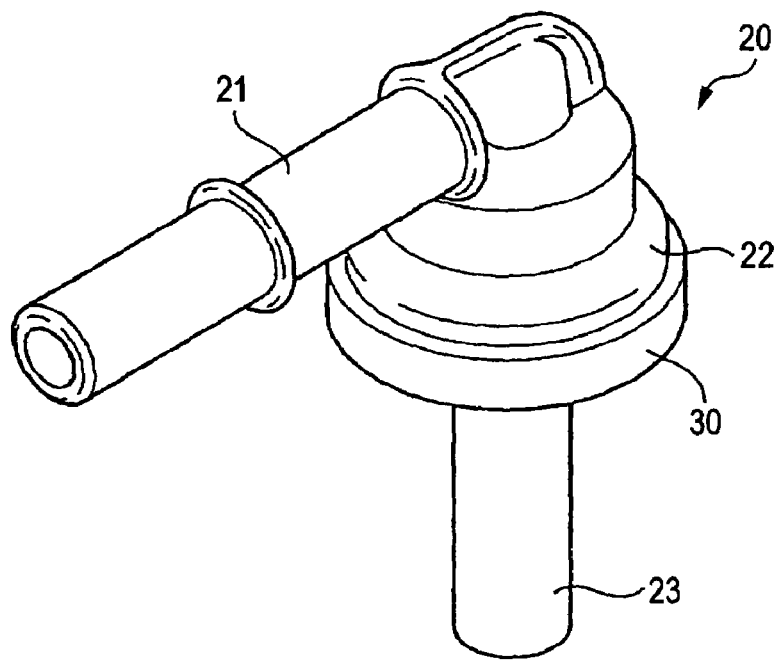
FIG. 1 is a perspective view showing a joint for fuel tank according to an embodiment of a present invention.
Figure 2:
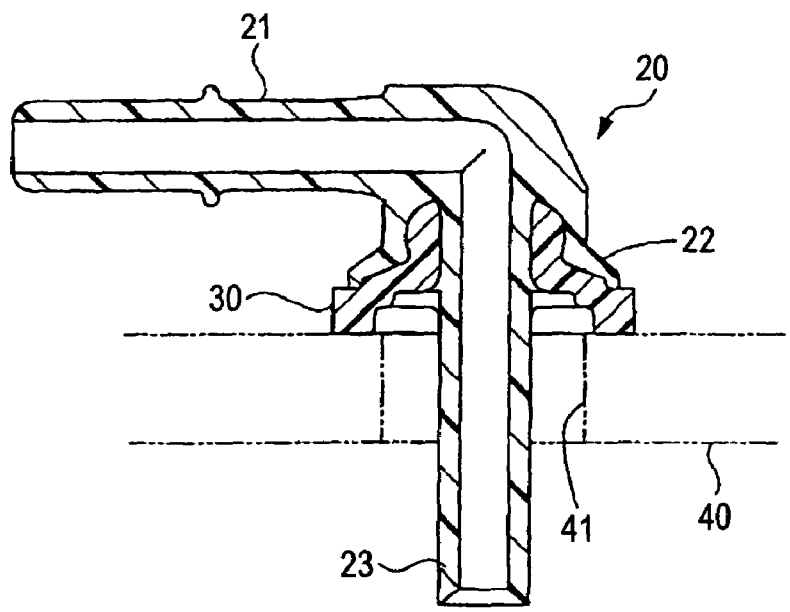
FIG. 2 is a sectional view showing the joint for fuel tank in a state of being connected to the fuel tank.

Hereinafter, an embodiment of the present invention will be described with reference to the drawings. FIGS. 1 and 2 show a joint for fuel tank according to an embodiment of the invention. FIG. 1 is a perspective view of the joint for fuel tank. FIG. 2 is a sectional view showing the joint for fuel tank in a state of being connected to the fuel tank.

As shown in FIGS. 1 and 2, a joint 10 for fuel tank includes a joint main body 20 made of a semi-aromatic polyamide and a flanged junction 30 made of a modified polyolefin. The joint main body 20 and the junction 30 are integrally connected by means of insert molding.

A pipe-connecting port 21, which is bent into an L-shape and defines an opening toward a lateral direction, is attached to the upper surface of the joint main body 20. A flange 22 extending outward is formed on the base side of the pipe-connecting port 21. A pipe 23 extends from the center of the lower surface of the flange 22. The flanged junction 30 made of the modified polyolefin is integrally formed on the lower surface of the flange 22 by means of insert molding. As shown in FIG. 2, the flange 22 of the joint main body 20 is integrally formed so as to surround the junction 30.

The joint main body 20 is made of a semi-aromatic polyamide obtained by polymerization of source monomers containing an aromatic monomer component and an aliphatic monomer component. Thus, the semi-aromatic polyamide of the embodiment of the invention is a polyamide, wherein at least one of constituent monomers has an aromatic ring, other than a wholly aromatic polyamide.

Examples of the aromatic monomer include aromatic dicarboxylic acids such as terephthalic acid, isophtalic acid, and naphthalene dicarboxylic acid; aromatic diamines such as naphtalene diamine and methaxylene diamine; and the like.

Examples of the aliphatic monomer include aliphatic dicarboxylic acids such as adipic acid, heptane dicarboxylic acid, octance dicarboxylic acid, nonane dicarboxylic acid, undecane dicarboxylic acid, and dodecane dicarboxylic acid; and alipatic diamines such as tetrametylenediamine, hexanemetylenediamine, octametylenediamine, nonametylenediamine, undecametylenediamine, and dodecametylenediamine.

As a result of polymerization of a diamine and dicarboxylic acid, which include at least one of the aromatic monomers listed above, the semi-aromatic polyamide can be obtained. The semi-aromatic polyamide may be either a homopolymer or a copolymer.

No particular limitation is imposed on such a combination of a diamine and a dicarboxylic acid. However, for instance, a semi-aromatic polyamide of a combination of terephtalic acid and hexamethylenediamine (PA6T nylon), that of terephtalic acid and nonamethylene diamine (PA9T nylon), that of adipic acid and methaxythylene diamine (MXD6 nylon), or the like, is preferably employed. These resins may be reinforced with glass fiber or the like.

Of the above, PA9T nylon or MXD6 nylon is preferable, in view of fuel permeability. Table 1 shows relationships between a variety of resin materials and fuel permeability. Measurement for Table 1 is performed at 60° C., with a cup method, in accordance with JIS-Z0208. Of fuels shown in Table 1, Fuel-C is a mixture of toluene and isooctane in a ratio of 1:1; CM15 is an alcohol-containing fuel, that is, Fuel-C containing 15% methanol; and E10 is an alcohol-containing fuel, that is, Fuel-C containing 10% ethanol.

TABLE 1

|  | Fuel-C | CM15 | E10 |
| --- | --- | --- | --- |
| PA9T | 0.1 | — | 1 |
| MXD6 | 0.8 | 13 | 0.7 |
| Nylon 6 | 1.1 | 97 | 3.2 |
| Nylon 11 | 6.5 | 218 | 31 |

As shown in Table 1, fuel permeability of PA9T nylon against Fuel-C is 0.1 $g/m^2$ day, and that of MXD6 nylon is 0.8 $g/m^2$-day, both of which are low; and those against E10, an alcohol-containing fuel, are 0.1 and 0.7 $g/m^2$ day, respectively, which are also low in comparison with those of conventional nylon 6, and nylon 11.

Of the above, MXD6 nylon is more preferable, in view of adhesive strength to the junction 30. MXD6 nylon is particularly excellent in fuel resistance, and is capable of maintaining adhesive strength to a modified polyolefin even after being soaked in fuel for a long time.

In addition, the amount of the terminal amino group of the semi-aromatic polyamide must be greater than or equal to 40 μeq/g. When the amount of the terminal amino group is smaller than 40 μeq/g, the amount of amino group remaining at terminals is reduced. As a result, adhesive strength of the junction to a modified polyolefin is decreased, making it less preferable.

Next, a modified polyolefin is used for the junction 30. The modified polyolefin is a resin wherein a polar functional group is introduced into a non-polar olefin resin by means of graft polymerization or the like. As a result, adhesion to both the polyolefin, which is the outermost layer of the fuel tank, and the semi-aromatic polyamide of the joint main body is enabled. Polar functional groups which can be introduced include a carboxyl group, a hydroxyl group, an amino group, a halogen group, an acrylic group, or the like; and no particular limitation is imposed thereon. However, in view of adhesiveness, an acid-modified polyolefin such as a polyolefin modified by a carboxyl group is preferable. More specific examples of such an acid-modified polyolefin include polyolefin modified by acrylic acid, methacrylic acid, maleic acid, or maleic anhydride.

The density of the modified polyolefin must fall within the range of 0.930 to 0.950 $g/cm^3$, and preferably falls within the range of 0.935 to 0.950 $g/cm^3$. The density is measured in accordance with JIS-K7112.

Table 2 shows relationships between density of polyethylene and fuel permeability. Measurement for Table 2 is performed at 60° C., with the cup method, in accordance with JIS-Z0208, with use of the previously-mentioned E10 (a mixture of toluene and isooctane in a ratio of 1:1, containing 10% ethanol) as the fuel.

TABLE 2

| Density (g/cm$^3$) | Fuel Permeability (g · mm/m$^2$ · day) |
|---|---|
| 0.947 | 390 |
| 0.942 | 400 |
| 0.935 | 490 |
| 0.925 | 850 |
| 0.920 | 1400 |

Table 2 reveals that when the density of the polyethylene is smaller than 0.930 g/cm$^3$, fuel permeability increases to a value greater than or equal to 500 g·mm/m$^2$ day, which is less preferable. Meanwhile, when the density of the polyethylene exceeds 0.950 g/cm$^3$, moldability decreases, which is less preferable.

Furthermore, the modified polyolefin must have a melt flow rate (MFR), as measured in accordance with JIS-K7210, of 0.06 to 3.0 g/10 minutes, and preferably has an MFR of 0.1 to 2.5 g/10 minutes. When the MFR of the modified polyolefin is less than 0.06 g/10 minutes, moldability and welding strength decrease. When the MFR exceeds 3.0 g/10 minutes, stress cracking resistance of the modified polyolefin decreases.

Specific examples of the modified polyolefin having density and MFR as described above include "MODIC-H511" (manufactured by Mitsubishi Chemical Corporation), "DK4100" (manufactured by Japan Polyolefin Co., Ltd.), and the like.

Next, a method for manufacturing the joint 10 for fuel tank is described below. First, the junction 30 is molded from the modified polyolefin. No particular limitation is imposed on the molding method, and conventionally known injection molding methods, or the like, can be employed.

Thereafter, the junction 30 is set in a die for the joint main body, thereby being subjected to insert molding as secondary molding. At this time, as a temperature requirement, the secondary molding is performed within a temperature range from a temperature higher by 30° C. than the melting point of semi-aromatic polyamide to the thermal decomposition point of the same. More specifically, when the above-mentioned PA9T (melting point: 290° C.) is employed as the semi-aromatic polyamide, the secondary molding is preferably performed at 320 to 340° C., more preferably at 330 to 340° C. When MXD6 is employed, the secondary molding is preferably performed at 270 to 300° C., more preferably at 280 to 300° C.

When the molding temperature is less than the melting point of the semi-aromatic polyamide plus 30° C., the time period during which the semi-aromatic polyamide is melted is short. Accordingly, adhesive strength between the semi-aromatic polyamide and the junction 30 becomes insufficient. Even in a case where sufficient initial adhesive strength is obtained, since the fuel resistance is decreased, adhesive strength deteriorates after soaking in fuel. In contrast, when the temperature exceeds the thermal decomposition point of the semi-aromatic polyamide, decomposition of the polyamide starts.

During the course of secondary molding, an injection-molding die for the joint main body is preferably maintained at 80 to 120° C. When the injection-molding die is lower than 80° C., cooing of the semi-aromatic polyamide becomes faster. As a result, adhesive strength between the semi-aromatic polyamide and the joint section 30 becomes insufficient, which is less preferable. In contrast, when the temperature exceeds 120° C., softening of the junction 30 results in deformation or the like, which is less preferable.

As shown in FIG. 2, the joint 10 for fuel tank obtained according to the above-mentioned manufacturing method covers a hole 41 of a fuel tank 40 so as to block the hole 41 while the pipe 23 being inserted into the fuel tank 40 through the hole 41. The joint 10 for fuel tank is attached to the fuel tank 40 by means of welding the lower surface of the junction 30 onto the fuel tank 40. An unillustrated fuel recovery pipe is connected to the pipe-connecting port 21.

The fuel tank 40 is constituted by laminating fuel non-permeating resin layers (ethylene/vinyl alcohol copolymer, or the like) and highly-adhesive resin layers (high-density polyethylene, or the like). The outermost layer of the fuel tank 40 is a high-density polyethylene layer, which has excellent adhesiveness to the junction 30.

In the joint 10 configured as described above, both the joint main body 20 and the junction 30 are excellent in fuel non-permeability. Accordingly, fuel permeation through the joint part to be connected can be sufficiently suppressed. Furthermore, adhesive strength between the joint main body 20 and the junction 30 is excellent such that the adhesive strength is not deteriorated even in a case of being soaked in fuel for a long time.

EXAMPLES

Examples 1, 2

Specimens for examples 1, 2 were prepared by means of insert molding with use of molding materials shown in Table 3 below. More specifically, as a primary molding process, a modified polyolefin was molded into a half size of an ASTM-type 1 dumbbell to prepare primary molded specimens. The primary molded specimen was inserted into a die, and injection molding was performed with use of a semi-aromatic polyamide as a secondary material. Accordingly, adhesion specimens equivalent to dumbbell of ASTM type 1 were obtained. In the examples, FANUC 100I was employed as a molding machine, and an ASTM abutment test piece mold was used as a die. The die for the injection molding for secondary molding was maintained at 80° C.

TABLE 3

| | | Example 1 | Example 2 |
|---|---|---|---|
| Semi-Aromatic Polyamide | Type | MXD6 | PA9T |
| | Melting Point | 243° C. | 290° C. |
| | Amount of Terminal Amino Group | 42 µeg/g | 50 µeg/g |
| Modified Polyolefin | MFR* | 0.3 | 0.6 |
| | Melting Point | 133° C. | 128° C. |
| | Density | 0.94 | 0.935 |

*Measurement was performed in compliance with JIS-K7210.

In Example 1, MXD6 (trade name: "Reny 1002H," manufactured by Mitsubishi Engineering-Plastics Corporation, thermal decomposition point: 310° C.) was used as the semi-aromatic polyamide; and a polyolefin modified by maleic anhydride (trade name: "MODIC H511," manufactured by Mitsubishi Chemical Corporation) was used as the modified polyolefin. An adhesive specimen was prepared while the temperature of secondary molding was changed from 260° C. to 300° C.

In Example 2, PA9T (manufactured by KURARAY Co., Ltd.) was used as the semi-aromatic polyamide; and a polyolefin modified by maleic anhydride (trade name: "DK4100," manufactured by Japan Polyolefin Corp., thermal decomposition point: 350° C.) was used as the modified polyolefin. An adhesive specimen was prepared while the temperature of secondary molding was changed from 300 to 340° C.

TEST EXAMPLES

The adhesive strengths of the adhesive specimens of Examples 1, 2 were measures with a tensile tester. The adhesive strength was measured under two conditions: A) in early stage after molding; and B) after the adhesive specimens had been soaked in fuel—which was regular gasoline containing 20% ethanol (hereinafter referred to as "E20")—for 200 hours at 60° C. The tensile test was performed at 20° C., at a tensile speed of 60 nm/minute, and with an inter-chuck distance of 130 mm. The results are summarized in Tables 4 and 5.

TABLE 4

Example 1

| Molding Temperature (° C.) | Adhesive Strength (MPa) | |
|---|---|---|
| | Early stage | After having been soaked in E20 |
| 260 | 15 | 3.0 |
| 270 | 15 | 6.5 |
| 280 | 15 | 9.2 |
| 290 | 15 | 9.8 |
| 300 | 15 | 11.5 |
| 310 | Decomposed | |

TABLE 5

Example 2

| Molding Temperature (° C.) | Adhesive Strength (MPa) | |
|---|---|---|
| | Early stage | After having been soaked in E20 |
| 300 | 11 | 0 |
| 320 | 15 | 0 |
| 330 | 15 | 4 |
| 340 | 15 | 10 |
| 350 | Decomposed | |

Tables 4 and 5 reveal that, with regard to initial adhesive strength, sufficient strength is obtained at a molding temperature of 260 to 300° C. in Example 1 where MXD6 was used; and sufficient strength is obtained at 300 to 340° C. in Example 2 where PA9T was used.

However, after soaking in E20, decrease in adhesive strength is less in Example 1 than in Example 2. This reveals that Example 1 using MXD6 is superior in terms of adhesive strength after fuel soaking.

The present invention is advantageously utilized as a joint for fuel tank to be attached to, e.g., an opening of a plastic fuel tank of a vehicle by means of thermal welding.

What is claimed is:

1. A joint for a resin fuel tank, comprising:
a joint main body; and
a flanged junction that is integrally connected to the joint main body and is weldable to a periphery of an opening of the fuel tank,
wherein the joint main body includes a semi-aromatic polyamide obtained by polymerization of source monomers containing an aromatic monomer component and an aliphatic monomer component,
wherein an amount of a terminal amino group of the semi-aromatic polyamide is greater than or equal to 40 µeq/g, and
wherein the flanged junction comprises a modified polyolefin having:
a density in a range of 0.930 g/cm$^3$ to 0.950 g/cm$^3$; and
a melt flow rate in a range of 0.06 g/10 minutes to 3.0 g/10 minutes.

2. The joint as defined in claim 1, wherein the aromatic monomer component comprises at least one monomer selected from the group consisting of aromatic dicarboxylic acids and aromatic diamines.

3. The joint as defined in claim 2, wherein the aromatic dicarboxylic acids monomer comprises at least one monomer selected from the group consisting of terephthalic acid, isophtalic acid, and naphthalene dicarboxylic acid.

4. The joint as defined in claim 2, wherein the aromatic diamines monomer comprises at least one monomer selected from the group consisting of naphtalene diamine and methaxylene diamine.

5. The joint as defined in claim 1, wherein the aliphatic monomer component comprises at least one monomer selected from the group consisting of aliphatic dicarboxylic acids and alipatic diamines.

6. The joint as defined in claim 5, wherein the aliphatic dicarboxylic acids monomer comprises at least one monomer selected from the group consisting of adipic acid, heptane dicarboxylic acid, octance dicarboxylic acid, nonane dicarboxylic acid, undecane dicarboxylic acid, and dodecane dicarboxylic acid.

7. The joint as defined in claim 5, wherein the alipatic diamines monomer comprises at least one monomer selected from the group consisting of tetrametylenediamine, hexanemetylenediamine, octametylenediamine, nonametylenediamine, undecametylenediamine, and dodecametylenediamine.

8. The joint as defined in claim 1, wherein the semi-aromatic polyamide comprises a copolymer of terephtalic acid and hexamethylenediamine.

9. The joint as defined in claim 1, wherein the semi-aromatic polyamide comprises a copolymer of terephtalic acid and nonamethylene diamine.

10. The joint as defined in claim 1, wherein the semi-aromatic polyamide comprises a copolymer of adipic acid and methaxythylene diamine.

11. The joint as defined in claim 1, wherein the modified polyolefin comprises a resin wherein a polar functional group is introduced into a non-polar olefin resin by graft polymerization.

12. The joint as defined in claim 11, wherein the polar functional groups comprise at least one group selected from the group consisting of a carboxyl group, a hydroxyl group, an amino group, a halogen group, and an acrylic group.

13. The joint as defined in claim 1, wherein the modified polyolefin comprises an acid-modified polyolefin.

14. The joint as defined in claim 13, wherein the polyolefin comprises at least one group selected from the group consisting of acrylic acid, methacrylic acid, maleic acid, and maleic anhydride.

15. The joint as defined in claim 1, wherein said flanged junction is other than welded or connected by joints to said joint main body, and no interconnect layer is disposed between said flanged junction and said joint main body.

16. The joint as defined in claim 1, wherein said modified polyolefin has a melt flow rate in a range of 1.0 g/10 minutes to 3.0 g/10 minutes.

17. The joint as defined in claim 1, wherein said modified polyolefin has a density in a range of 0.930 g/cm$^3$ to 0.940 g/cm$^3$.

18. A joint for a resin fuel tank, comprising:

a joint main body; and a flanged junction that is integrally formed with the joint main body and is weldable to a periphery of an opening of the fuel tank, wherein the joint main body includes a semi-aromatic polyamide obtained by polymerization of source monomers comprising an aromatic monomer component and an aliphatic monomer component, wherein an amount of a terminal amino group of the semi-aromatic polyamide is greater than or equal to 40 μeq/g, wherein said flanged junction is not welded or connected by joints to said joint main body, and there is no interconnect layer between said flanged junction and said joint main body, and wherein the flanged junction comprises a modified polyolefin having:

a density in a range of 0.930 g/cm$^3$ to 0.940 g/cm$^3$; and a melt flow rate in a range of 1.0 g/10 minutes to 3.0 g/10 minutes.

* * * * *